(12) United States Patent
Kasatkin

(10) Patent No.: US 12,499,212 B2
(45) Date of Patent: Dec. 16, 2025

(54) APPARATUS AND METHOD FOR KERNEL RUNTIME RANDOMIZATION

(71) Applicant: Huawei Technologies Co., Ltd., Shenzhen (CN)

(72) Inventor: Dmitry Kasatkin, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 675 days.

(21) Appl. No.: 17/555,043

(22) Filed: Dec. 17, 2021

(65) Prior Publication Data

US 2022/0108003 A1 Apr. 7, 2022

Related U.S. Application Data

(63) Continuation of application No. PCT/EP2019/066136, filed on Jun. 19, 2019.

(51) Int. Cl.
G06F 21/52 (2013.01)
G06F 21/10 (2013.01)
G06F 21/12 (2013.01)

(52) U.S. Cl.
CPC .............. *G06F 21/52* (2013.01); *G06F 21/12* (2013.01); *G06F 21/1062* (2023.08); *G06F 2221/033* (2013.01)

(58) Field of Classification Search
CPC ...... G06F 21/52; G06F 21/12; G06F 21/1062; G06F 2221/033
See application file for complete search history.

(56) References Cited

U.S. PATENT DOCUMENTS 7,877,561 B2 * 1/2011 Francis ............... G06F 11/1471
  711/E12.019
10,311,228 B2 * 6/2019 Vidrine ............... G06F 12/0284
(Continued)

FOREIGN PATENT DOCUMENTS

CN 105787368 A 7/2016

OTHER PUBLICATIONS

"ELF for the ARM 64-bit architecture (AArch64)," ARM IHI 0056B, current through AArch64 ABI release 1.0, pp. 1-27, ARM Limited (May 22, 2013).

(Continued)

*Primary Examiner* — Ghazal B Shehni
*Assistant Examiner* — Ghizlane Maazouz
(74) *Attorney, Agent, or Firm* — Leydig, Voit & Mayer, Ltd.

(57) ABSTRACT

An apparatus includes a processor coupled to a non-volatile memory and a runtime memory. The processor is configured to read, from the non-volatile memory, a linked executable image and a randomization image. The linked executable image includes a linked executable program, and the randomization image includes one or more of a symbol table, a relocation table, and an object table. The processor loads the linked executable image to generate a runtime program, performs a runtime randomization to generate a randomized runtime program, and executes the randomized runtime program. The runtime randomization includes: copying a segment of the runtime program to a temporary location, wherein the copied segment comprises a plurality of relocatable objects; generating a randomized runtime program by writing each relocatable object into the runtime program based on a random ordering of the plurality of relocatable objects; and performing relocations for the randomized runtime program.

24 Claims, 4 Drawing Sheets

(56) References Cited

U.S. PATENT DOCUMENTS

| | | | | |
|---|---|---|---|---|
| 11,809,871 | B2* | 11/2023 | Hong | G06F 21/54 |
| 2007/0234002 | A1* | 10/2007 | Litke | G06F 12/10 |
| | | | | 711/202 |
| 2008/0222207 | A1 | 9/2008 | Ito | |
| 2015/0047049 | A1* | 2/2015 | Panchenko | G06F 21/14 |
| | | | | 726/26 |
| 2015/0347162 | A1* | 12/2015 | Ahmad | G06F 9/44521 |
| | | | | 717/162 |
| 2016/0092675 | A1* | 3/2016 | Vidrine | G06F 21/52 |
| | | | | 726/22 |
| 2017/0344304 | A1* | 11/2017 | Alves | G06F 3/0608 |
| 2018/0046585 | A1* | 2/2018 | Okhravi | G06F 12/023 |
| 2019/0114401 | A1* | 4/2019 | De | G06F 21/64 |
| 2019/0155743 | A1* | 5/2019 | Loreskar | G06F 21/575 |
| 2020/0089502 | A1* | 3/2020 | Hong | G06F 8/65 |
| 2022/0284115 | A1* | 9/2022 | Tang | G06F 21/6218 |

OTHER PUBLICATIONS

"Linux Kernel 2.6.36-rc8—'RDS Protocol' Local Privilege Escalation," https://www.exploit-db.com/exploits/15285, Total 7 pages (Oct. 19, 2010).

"Address space layout randomization," https://en.wikipedia.org/wiki/Address_space_layout_randomization, Total 10 pages, Wikipedia (Jan. 2022).

"Executable and Linkable Format," https://en.wikipedia.org/wiki/Executable_and_Linkable_Format, Total 16 pages, Wikipedia (Jan. 2022).

* cited by examiner

APPARATUS AND METHOD FOR KERNEL RUNTIME RANDOMIZATION

CROSS-REFERENCE TO RELATED APPLICATIONS

This application is a continuation of International Application No. PCT/EP2019/066136, filed on Jun. 19, 2019, the disclosure of which is hereby incorporated by reference in its entirety.

TECHNICAL FIELD

The aspects of the disclosed embodiments relate generally to computing apparatus and more particularly to software security within a mobile communications apparatus.

BACKGROUND

Modern computing apparatus, such as cell phones and other communications enabled mobile computing devices, employ an operating system kernel, referred to as a kernel, to manage software applications running within the apparatus. Kernels, and in particular a Linux™ Kernel, are known to be vulnerable to various attacks which may perform privilege escalation, such as gaining root access or root capabilities.

The Linux kernel typically starts from a well-known virtual address as determined by the kernel linking configuration, and the locations of all functions and data within the kernel are determined during linking and remain the same each time the kernel is loaded. Many exploits or attacks are based on knowledge of the kernel functions and data, and their locations within the address space. For example, one class of attacks, known as return oriented programming (ROP) attacks or return to libc, exploit small portions of the kernel code, referred to a gadgets, based on knowledge of their runtime addresses. Information necessary for this type of attack can be obtained from the kernel image and through data leakage.

One approach to preventing these attacks is known as kernel address space layout randomization (KASLR). KASLR seeks to prevent an attacker from jumping to a known gadget by randomly arranging important data areas of a program, such as by randomizing a base address of the executable, data, stack, heap, and similar areas of included libraries.

When KASLR is used during loading of a kernel, an attacker needs to obtain the address of only a single function to determine the addresses of all remaining kernel functions and data objects. The address of certain kernel functions is often revealed through data leakage during startup or execution of the kernel, thus providing means to compromise a kernel that has been loaded using KASLR.

Other randomization and loading techniques have been tried, however each has its own known vulnerabilities. Thus there is a need for improved methods and apparatus for protecting a kernel or other loaded software program from exploitation. Accordingly, it would be desirable to provide methods and apparatus that address at least some of the problems identified above.

SUMMARY

It is an object of the disclosed embodiments to provide improved software security for a kernel and other software program while executing within a computing apparatus. This object is solved by the subject matter of the independent claims. Further advantageous modifications can be found in the dependent claims.

According to a first aspect, the above and further objects and advantages are obtained by an apparatus that includes a processor coupled to a non-volatile memory and a runtime memory. The processor is configured to read, from the non-volatile memory, a linked executable image and a randomization image. The linked executable image includes a linked executable program, and the randomization image includes one or more of a symbol table, a relocation table, and an object table. The processor loads the linked executable image within the runtime memory to generate a runtime program, performs a runtime randomization on the runtime program to generate a randomized runtime program, and executes the randomized runtime program. The runtime randomization includes copying a segment of the runtime program to a temporary location, wherein the copied segment comprises a plurality of relocatable objects; generating a randomized runtime program by writing each relocatable object in the plurality of relocatable objects into the runtime program based on a random ordering of the plurality of relocatable objects; and performing relocations for the randomized runtime program. Performing the relocations includes updating one or more of a symbol table, a relocation table, a code segment, and a data segment. Randomly ordering the plurality of relocatable objects prevents an attacker from using portions of the relocatable objects to compromise the runtime program by placing each relocatable object at an unpredictable and unknown location within the runtime program.

In an embodiment of the apparatus according to the first aspect the processor is configured to erase the segment after copying the segment. Erasing or initializing the memory used by the segment ensures none of the program objects or functions can be located and/or used by an attacker.

In an embodiment of the apparatus according to the first aspect, the segment includes a plurality of segments and the plurality of segments may include one or more of a text segment and a data segment, and the processor is configured to copy the plurality of segments to the temporary location. Copying multiple segments improves security by randomizing a larger portion of the runtime program.

In an embodiment of the apparatus according to the first aspect, the linked executable image and the randomization image include a compressed data, and the processor is configured to read and decompress the compressed data. Storing the linked executable and the randomization image in a compressed form reduces the amount of non-volatile storage used to store the linked executable image and the randomization image.

In an embodiment of the apparatus according to the first aspect, the plurality of relocatable objects includes one or more of a compilation unit, a function, and a data object, and the processor is configured to write each relocatable object in the plurality of relocatable objects into the randomized runtime program based on the random ordering of the plurality of relocatable objects. The use of different types of relocatable objects provides alternatives that can provide differing advantages based on specific details of the application being randomized.

In an embodiment of the apparatus according to the first aspect, loading the linked executable image includes generating a random offset value; loading the runtime program based on the random offset value; and updating a dynamic relocation table based on the random offset value. Randomizing the base address of the runtime program along with the runtime randomization process adds additional randomization to the locations of code and data objects within the randomized runtime program, thereby making it more difficult for an attacker to identify the locations of program objects or gadgets they are trying to attack.

In an embodiment of the apparatus according to the first aspect the processor is configured to perform the runtime randomization within the context of a boot loader. Configuring the loader or boot loader to perform runtime randomization allows runtime randomization to be performed on linked executable images that are not designed to randomize themselves.

In an embodiment of the apparatus according to the first aspect, the randomization image is embedded within the linked executable image and the processor is configured to read the linked executable image and a randomization image. Combining the linked executable image and the randomization image into the same loadable image allows a program configured to perform its own runtime randomization to be loaded by conventional loaders without the need for the loader to know about the runtime randomization process or be configured to perform runtime randomization.

In an embodiment of the apparatus according to the first aspect, the runtime program comprises a kernel and the processor is configured to perform the runtime randomization within the context of the kernel. Runtime randomization is especially beneficial when applied to a kernel because the kernel tends to run for extended periods of time and many portions of a kernel run at elevated privilege levels.

In an embodiment of the apparatus according to the first aspect, the apparatus comprises a mobile communication device. Mobile communication devices such as cell phones benefit greatly from improved security due to the many highly sensitive applications they run, such as banking applications, shopping applications, social media accounts, which can have serious financial and personal consequences if they are compromised.

According to a second aspect, the above and further objects and advantages are obtained by a method that includes: reading, from a non-volatile memory, a linked executable image and a randomization image, wherein the linked executable image includes a linked executable program, and the randomization image comprises one or more of a symbol table, a relocation table, and an object table; loading the linked executable image within the runtime memory to generate a runtime program; performing a runtime randomization on the runtime program to generate a randomized runtime program; and executing the randomized runtime program. Performing the runtime randomization includes; copying a segment of the runtime program to a temporary location, wherein the copied segment includes a plurality of relocatable objects; generating a randomized runtime program by writing each relocatable object in the plurality of relocatable objects into the runtime program based on a random ordering of the plurality of relocatable objects; and performing relocations of the randomized runtime program. Performing the relocations includes updating one or more of a symbol table, a relocation table, a code segment, and a data segment. Runtime randomization of the plurality of relocatable objects results in memory addresses or locations for each relocatable object that are unpredictable and unknowable to an attacker.

In an embodiment of the method according to the second aspect, the segment includes a plurality of segments and the plurality of segments comprises one or more of a text segment and a data segment, and the plurality of segments are copied to the temporary location. Copying multiple segments improves security by randomizing a larger portion of the runtime program.

In an embodiment of the method according to the second aspect, loading the linked executable image includes: generating a random offset value; loading the linked executable image based on the random offset value; and updating a dynamic relocation table based on the random offset value. Randomizing the base address of the runtime program along with the runtime randomization process adds additional randomization to the locations of code and data objects within the randomized runtime program, thereby making it more difficult for an attacker to identify the locations of program objects or gadgets they are trying to attack.

In an embodiment of the method according to the second aspect, the method is performed within a mobile communication device. Mobile communication devices such as cell phones benefit greatly from the improved security due to the many highly sensitive applications they run, such as banking applications, shopping applications, social media accounts, etc., which can have serious financial and personal consequences if they are compromised.

According to a third aspect, the above and further objects and advantages are obtained by a computer program product including non-transitory computer program instructions that when executed by a processor are configured to cause the processor to perform the method according to the second aspect.

These and other aspects, embodiments, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

In the following detailed portion of the present disclosure, the invention will be explained in more detail with reference to the example embodiments shown in the drawings, in which.

DETAILED DESCRIPTION OF THE DISCLOSED EMBODIMENTS

Figure 1:
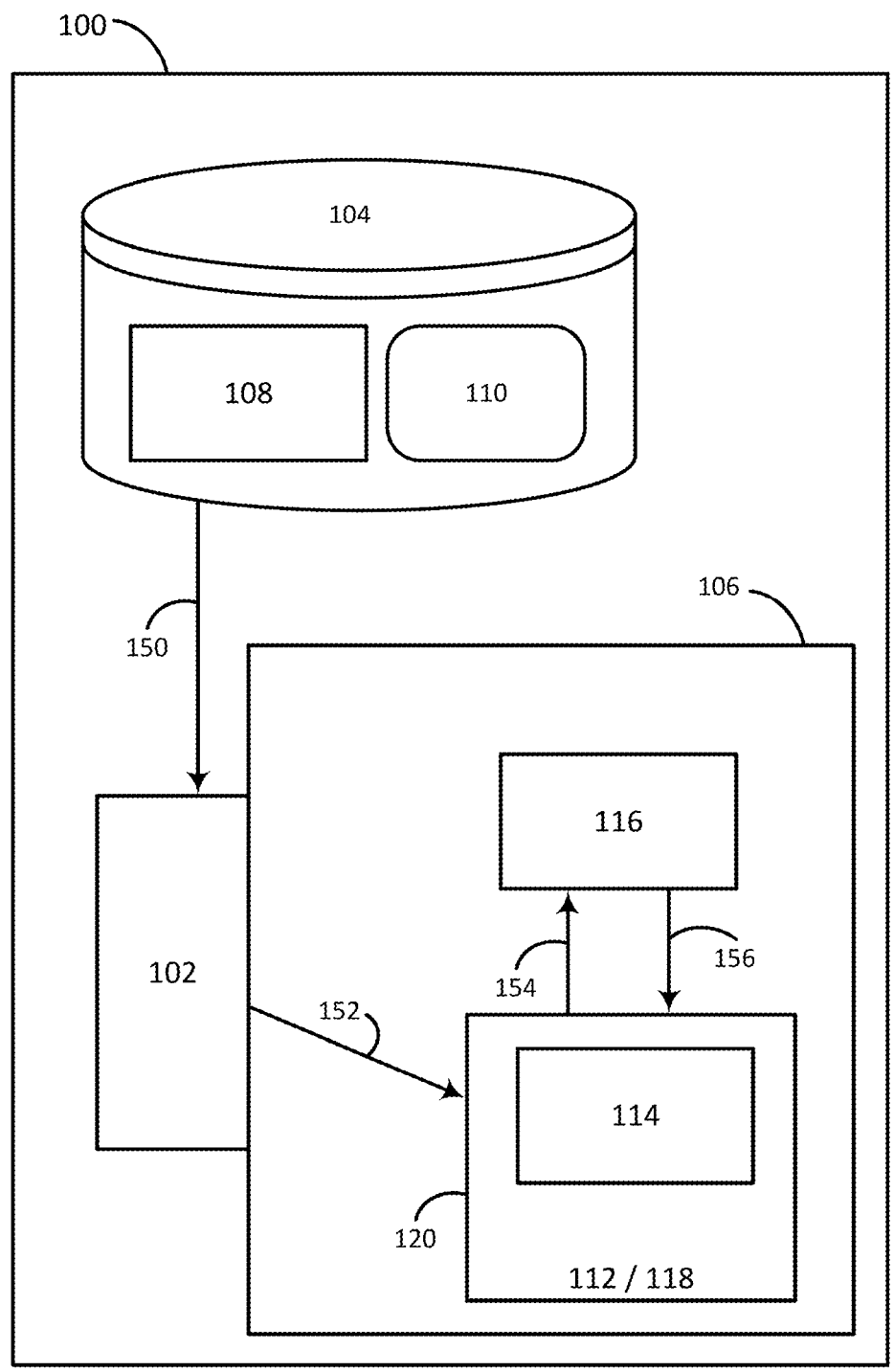
FIG. 1 illustrates a block diagram of a computing apparatus configured to generate and execute a randomized program executable incorporating aspects of the disclosed embodiments.

Referring to FIG. 1 there can be seen a block diagram illustrating a computing apparatus 100 configured to generate and execute a randomized program executable 118 incorporating aspects of the disclosed embodiments. The apparatus 100 provides improved security by performing runtime, in memory 120, randomization of a runtime program 112 to produce a randomized runtime program 118. The randomization process randomly modifies the order and location of relocatable objects, such as functions or compilation units, such that the runtime locations of functions and other objects within the randomized runtime program 118 are unpredictable and unknowable to an attacker. As used herein the term runtime program refers to a software program or software application that has been loaded into main memory or other primary memory 106 of a computing apparatus 100 and prepared for execution such that all addresses have been adjusted and the runtime program is fully ready to begin execution. In a computing apparatus, such as the computing apparatus 100, which supports a virtual address space, the runtime program refers to a software program image that has been loaded into virtual memory and fully prepared for execution. For the purposes of this disclosure the runtime program may for example be a compiled, linked and loaded operating system Kernel, or any other desired software application or program that has been compiled, linked and loaded into computer memory 106.

Runtime randomization modifies or changes memory locations or memory addresses of objects and/or functions in a runtime application 112 to produce a randomized runtime program 118. As an aid to understanding aspects of the present disclosure will be described with respect to an operating system kernel, referred to herein as a kernel, however those skilled in the art will readily recognize that the disclosed aspects can be advantageously employed to randomize the in memory image of any type of software application or executable program and are not limited to a kernel. The objects to which runtime randomization is applied are referred to herein as relocatable objects and may be any appropriate portion of an executable program such as a compilation unit, function, group of functions, data objects, etc.

Execution of a program or software application by the computing apparatus 100 begins when the processor 102 reads 150 a linked binary image or linked executable image 108 from a storage device or other non-volatile storage 104 and loads 152 it into runtime memory 106. The term runtime memory 106 as used herein refers to computer main or primary memory and may be a virtual address space used by the processor 102 to access software applications during their execution. In certain embodiments runtime memory 106 may be referred to as primary storage or main memory, and be implemented as a relatively high speed computer memory, such as random access memory, where computer programs may be stored during their execution. In a computing apparatus that employs a virtualized address space, runtime memory 106 refers to the virtual address space used by the processor when accessing software programs that are currently being executed. Portions of the virtual address space 106 may be swapped into and out of an underlying physical memory as needed. The underlying physical memory may be relatively high speed as compared to the speed of a non-volatile memory 104. Runtime memory 106 is distinct from storage or non-volatile memory 104 which typically has significantly slower access times and provides large volumes of data storage space that is non-volatile in nature.

A randomization image 110 is read 150 from non-volatile storage 104 along with the linked executable image 108. As will be discussed further below, the randomization image 110, which may also be referred to as a relocation image, includes various data tables and relocation information, such as symbol tables, object tables, and relocation tables, which are configured to help the randomization process generate the randomized runtime program 118 from data incorporated in the linked executable image 108 or runtime program 112.

In the illustrated embodiment of FIG. 1, the linked executable image 108 and the randomization image 110 reside separately within the non-volatile storage 104. In one embodiment the linked executable image 108 and the randomization image 110 may be placed in different files or packages as indicated and stored on different partitions within the non-volatile storage 104. Alternatively or optionally, the linked executable image 108 and the randomization image may be combined into a single file or package, or the linked executable image 108 and the randomization image may be distributed using more than two files or packages as desired. In certain embodiments a cryptographic signature may be incorporated into the distributed packages and configured to verify an integrity of the distributed packages. When desired the entirety of the package or packages may be cryptographically secured or protected to ensure confidentiality of information in the distribution package or packages.

As part of preparing the runtime program 112 for execution, the linked executable image 108 is loaded 152 into an area 120 of the memory 106 to generate a runtime program 112 or runtime image within the memory 106. After loading 152 the runtime program 112 into the memory area 120, a runtime randomization process is applied to the runtime program 112 to produce a randomized runtime program 118. Note that the runtime program 112 and the randomized runtime program 118 occupy the same area 120 of the memory 106. For clarity, the runtime program 112 is differentiated from the randomized runtime program 118 through the use of different reference numerals, 112 and 118 respectively. The runtime randomization process, as will be discussed further below, randomly changes the order and relative positions of various relocatable objects within the runtime program 112 to produce a randomized runtime program 118 where the location within the randomized runtime program 118 of each relocatable object is modified from its original location in the linked executable image 108 such that it is unknown and unpredictable to an attacker.

In certain embodiments, security may be improved by randomly offsetting the address space positions of key data areas of the runtime program 112. The process of randomly offsetting key data areas may be referred to as kernel address space layout randomization (KASLR) and may be accomplished by generating one or more random offset values then using these random values to offset the memory location or address at which each key memory area of the runtime program 112 is loaded. One or more of the key memory areas of the runtime program 112 may be randomly arranged in this fashion. Any relocation, symbol, or other tables are appropriately updated during the loading process 152 based on the random arrangement. ASLR prevents an attacker from directly using a priori knowledge of the linked executable image to locate the memory addresses of functions, data, or other gadgets within the runtime program 112.

A drawback to using KASLR is that modification of the base addresses does not change the relative offset between various functions or data within a runtime program 112. Once an attacker finds the address or location of one function or data object, the locations of other functions or data objects becomes known based on a priori knowledge of the relative positions of program objects within the linked executable image 108. This drawback is solved by the runtime randomization process described below.

The runtime randomization process is applied to the in memory image 120 of the runtime program 112 to generate the randomized runtime program 118. The runtime randomization process randomly modifies the locations and relative positions of relocatable objects, such as functions, compilation units, and data objects, of the runtime program 112 so that an attacker cannot know or predict where each relocatable object resides in the runtime memory 120 occupied by the randomized runtime program 118. Further, by performing the randomization process on the in-memory 120 runtime program 112 and writing the generated randomized runtime program 118 back to the same runtime memory area 120, the randomized runtime program 118 is never written or stored on non-volatile storage. Data that is written to non-volatile storage may be referred to as data at rest. Because data at rest may remain constant for extended periods of time, writing data such as a randomized runtime program to a non-volatile storage 104 exposes the stored data to attack. Performing runtime randomization directly on the in-memory runtime program 112 and never storing the generated randomized runtime program 118 to non-volatile storage 104, eliminates the risks associated with having data at rest.

The randomization process operates on the linked executable image 108 after it is loaded into memory 120. In one embodiment the randomization process is implemented within the runtime program 112 and is executed within the context of the runtime program 112 at the very early stages of execution of the runtime program 112 such as before program initialization is started. In this embodiment it may be advantageous to embed or insert the randomization image 110 directly into the linked executable image 108. Performing the randomization process after the runtime program 112 has been started allows secure boot processes and methodologies to be applied to ensure integrity of the linked executable image 108 and the randomization image 110.

Alternatively, the randomization process may be implemented as part of the loader or boot loader used to load the linked executable program 108 into memory 106. When randomization is performed by, or in the context of, the boot loader before the runtime program 112 has been started, it may be advantageous to store the randomization image 110 on non-volatile storage 104 separately from the linked executable image 108 for example in a separate file or on a different partition.

After generating the randomized runtime program 118 within the area of runtime memory 120, the randomized runtime program may be safely executed.

The randomization process used to generate the randomized runtime program 118 from the runtime program 112 copies 154 a segment 114 of the runtime program 112 to a temporary area of memory 116. The segment may be any desired portion of the runtime program 112 such as a text segment, data segment, and/or other desired portion of the runtime program 112 as loaded into the runtime memory 120. Increasing a size of the segment 114, such as by including both the text segment and a data segment and/or other desired portions of the runtime program 112, increases the amount of randomization and improves the resulting security benefits. However, the advantages gained by increasing the size of the segment 114 come at the cost of increased processing necessary to complete the randomization process and prepare the randomized runtime program 118 for execution.

Optionally after copying the segment 114 to the temporary location 116, the original area of runtime memory 120 occupied by the segment 114 may be initialized or set to any desired values. Initialization may be performed to erase the original information and may also be configured to write random data or deliberately fake information into the original memory occupied by the segment 114 to further frustrate an attacker.

Beneficially the copied segment 116 includes a plurality of relocatable objects. A relocatable object is a portion of the runtime program 112, such as a compilation unit function, group of functions, or a data object, which can be moved or relocated to a different address or memory location within the randomized runtime program 118. Any appropriate object may be chosen as a relocatable object such as a compilation unit, a function, a group of functions, a data object, etc. As used herein a compilation unit is the object code resulting from compilation or assembly of a single file containing source code, such as a C programming language source file, and may include several functions or classes. As will be discussed further below, the randomization image 110 includes information specific to each relocatable object to facilitate relocation of the associated relocatable object.

The plurality of relocatable objects is copied 156 from the temporary location 116 back to the original segment 114 in random order thereby ensuring that the location of each relocatable object within the memory area 120 is unpredictable. Random ordering may be accomplished in any appropriate fashion. Such as by employing a random number generator or other random process to select and copy the relocatable objects. Alternatively, a list of the plurality of relocatable objects may be created and randomly ordered and subsequently used to guide copying 156 of the relocatable objects back to the runtime memory 120.

Relocation of the randomly ordered relocatable objects 114 is completed by updating all associated symbol tables and relocation tables along with any other information required to prepare the randomized runtime program 118 for execution. Because the randomized runtime program 118 is generated directly in runtime memory 106 after the runtime program 112 is loaded and optionally after the runtime program 112 is started, the randomized runtime program 118 is never stored to non-volatile storage where it may be vulnerable to attack.

In certain embodiments, space on the non-volatile storage 104 can be used more efficiently by compressing the linked executable image 108 and optionally compressing the randomization image 110. Any suitable compression technique may be used for compression, such as for expel and entropy encoding compression technique. The linked executable image 108 and the randomization image 110 may be decompressed during loading to recover the original program data.

A linked executable image 108, such as a kernel image, is produced by a build process and package as a kernel image which is flashed to non-volatile storage 104 on the apparatus 100 during manufacturing or by a specially configured software update tool. When the apparatus 100 is powered on or rebooted, a bootloader program loads the kernel image from storage 104 and passed control to the loaded kernel 112. The build process includes a compilation phase where source code, which is a human readable representation of a computer program, is compiled or assembled to produce a binary machine readable representation of the program referred to herein as object files. One or more object files are then linked together to produce a linked executable program image 108. The linked executable image is in a form that the boot loader can use to load and execute the runtime program 112.

Figure 2:
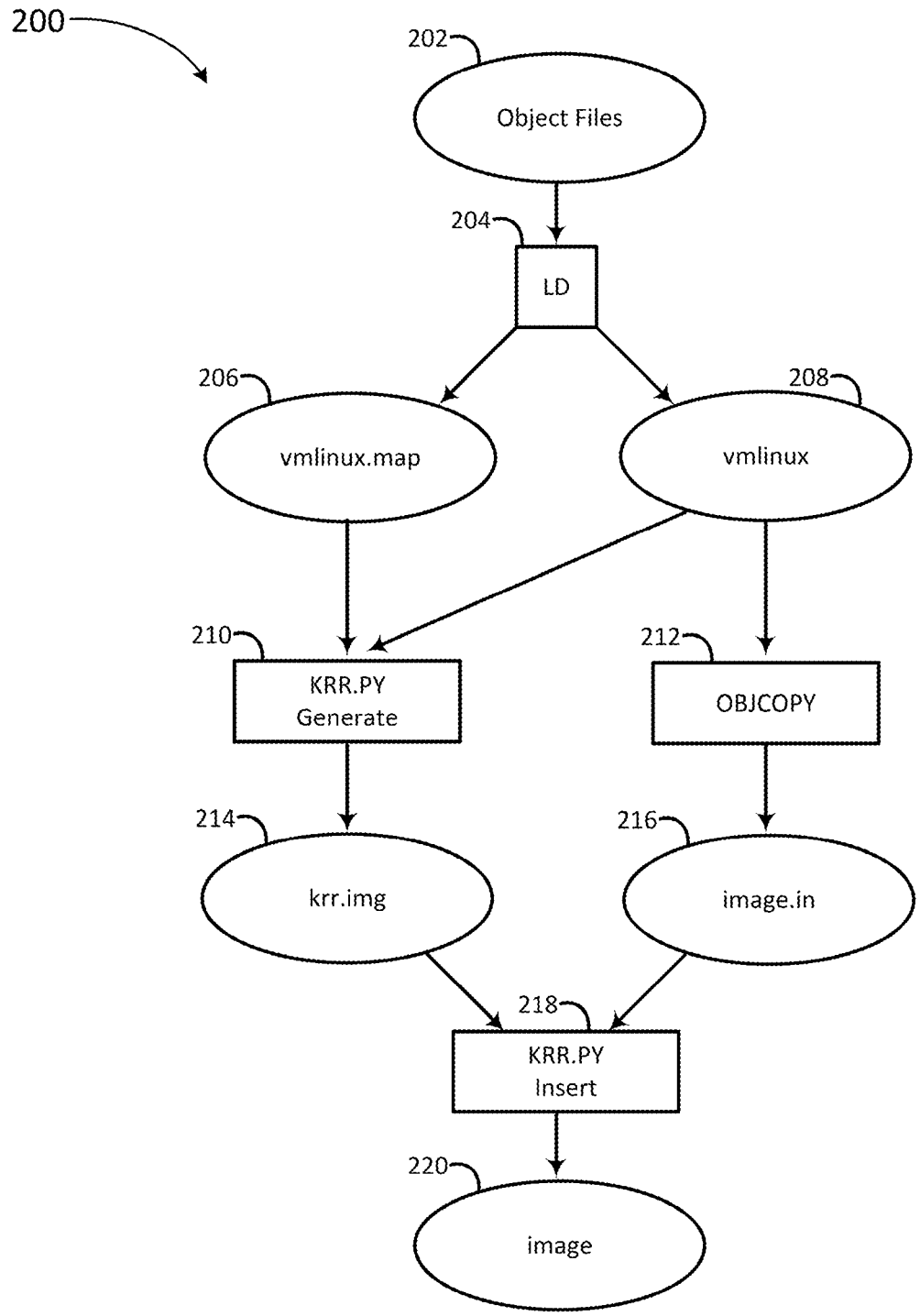
FIG. 2 illustrates an enhanced build process configured to produce a randomization image incorporating aspects of the disclosed embodiments.

FIG. 2 illustrates an enhanced build process 200 configured to produce a randomization image 214 incorporating aspects of the disclosed embodiments. The enhanced build process 200 is appropriate for generating the linked executable image 108 and randomization image 110 described above and with reference to FIG. 1. Runtime randomization of a runtime program, such as the runtime program 112 described above, to produce the randomized runtime program, such as the randomized runtime program 118 described above, is facilitated by enhancing the build process 200 to include a generation phase that produces a randomization image 214 appropriate for use as the randomization image 108 described above and with reference to FIG. 1.

The enhanced build process 200 illustrated in FIG. 2 receives one or more object files 202 such as the object files produced by compiling or assembling computer source code. The object files 202 are then linked, such as with a linker program, to produce a statically linked program image 208 such as a kernel image which may be referred to as vmlinux. The term vmlinux refers to a statically linked linux kernel image configured for use with a virtual memory. The following description of the enhanced build process 200 includes terminology consistent with building a kernel, however those skilled in the art will readily recognize that the enhanced build process 200 may be advantageously employed to build any desired type of computer program.

Files created by the linker 204, such as the linking map vmlinux.map 206 and the linked executable image vmlinux 208 are used to generate 210 a randomization image 214. In one embodiment the randomization image 214 is stored in a file named krr.img. The randomization image 214 may when desired include symbol and relocation tables derived from vmlinux.map 206 and vmlinux 208 and may be formatted as an executable and linkable format (ELF) binary file.

The linker 204 outputs the vmlinux image 208 and a corresponding vmlinux.map 206 containing a symbol table or linking map along with other relocation information useful for working with the vmlinux image 208. During the randomization process the relocatable objects are moved to different locations within the runtime program image, thereby invaliding addresses set during static linking and invalidating addresses contained in the map, vmlinux.map 206. The linked executable image, vmlinux 208, and the system linking map, vmlinux.map 206 include additional tables, such as a global symbol table, kallsyms, an exported symbol table, ksymtab, and a dynamic relocation table, realadyn, which will also contain invalid addresses after the relocatable objects have ben reordered during runtime randomization.

To support reordering of the relocatable objects during runtime randomization, a separate set of tables is generated for each relocatable object containing information specific to the corresponding relocatable object. These sets of object specific tables are referred to herein as owner tables because they correspond to or are owned by a specific relocatable object. This set of tables may include for example a symbol owner table, a relocation owner table, a global symbol owner table such as a kallsyms owner table, and/or a runtime or dynamic relocation owner table or reladyn owner table. Information necessary to move a particular relocatable object is contained in the corresponding set of owner tables.

Generation 210 creates the above described symbol, relocation, object, and owner table data and incorporates it into the randomization image 214. The resulting randomization image 214 contains all data and other information necessary to efficiently perform runtime randomization and prepare a randomized runtime program, such as the randomized runtime program 118 described above, for execution.

In certain embodiments it is desirable to embed the randomization image 214 into the same file or distribution package as the linked executable image 208. This may be accomplished for example by using an object copy program 212 to create a bootable raw binary image, image.in 216 from the vmlinux image 208. The randomization image krr.img 214 is then inserted 218 into the bootable binary image 216 to produce a single image or package 220.

Figure 3:
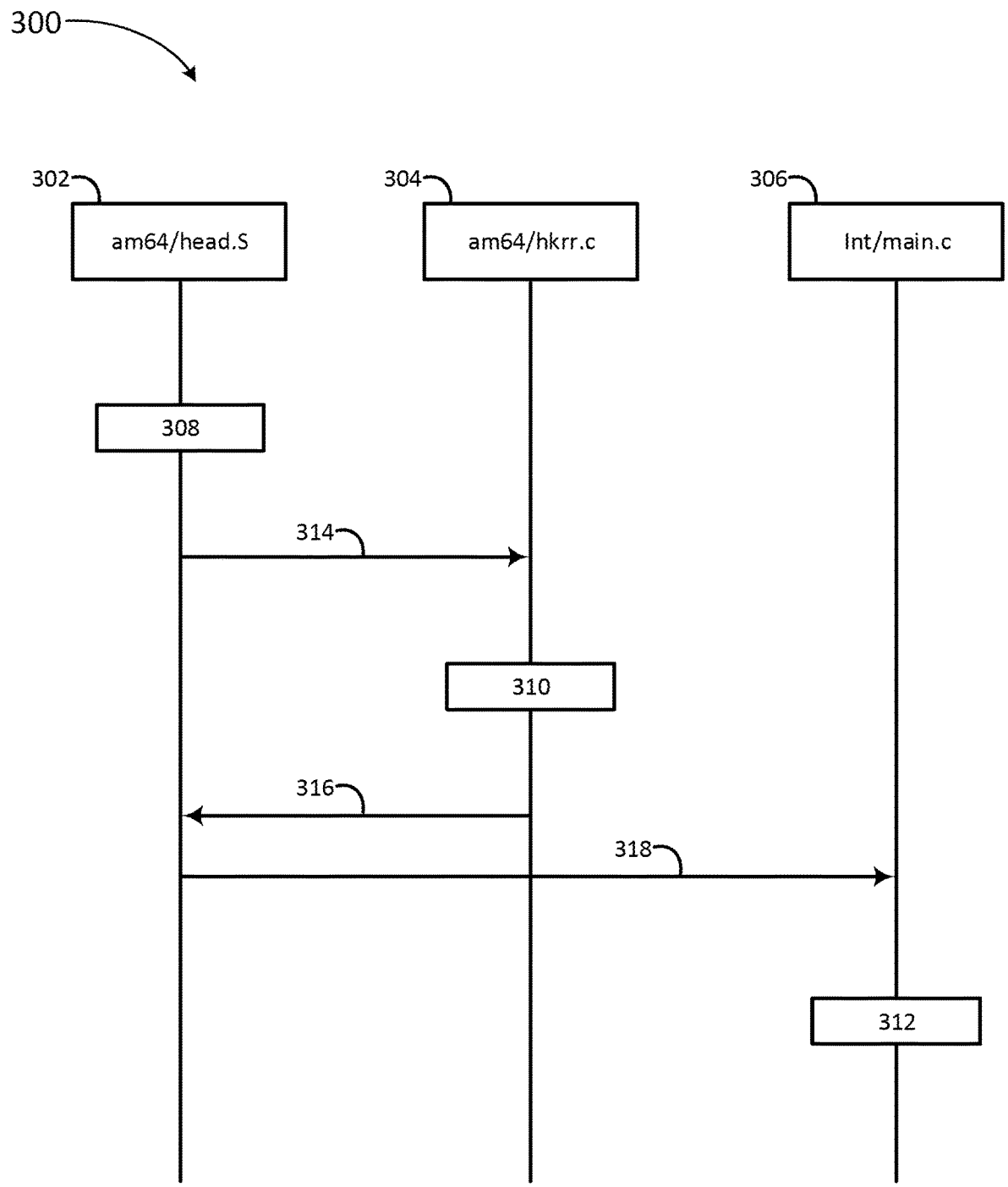
FIG. 3 illustrates a sequence diagram showing how runtime randomization may be incorporated into the process of loading and starting a kernel incorporating aspects of the disclosed embodiments.

FIG. 3 illustrates a sequence diagram showing how runtime randomization may be incorporated into the process of loading and starting a Linux kernel incorporating aspects of the disclosed embodiments. As an aid to understanding the process 300 illustrated in FIG. 3 shows an embodiment where runtime randomization is performed within a Linux kernel at the very earliest stages of kernel execution such as during execution of the processor specific head. S 302 portion of the kernel code. A runtime randomization component 304 depicts the novel randomization process disclosed herein, and the non-processor specific portions of the kernel are illustrated as a third component 306.

The illustrated process 300 begins after a linked executable image and a randomization image have been read from a storage device, such as the non-volatile storage device 104 described above and with reference to FIG. 1, and loaded into primary memory of a computing apparatus such as the computing apparatus 100 described above. The linked executable image may be a linked executable image such as the linked executable image 108 described above and with reference to FIG. 1, the bootable image 216 or the combined image 220 described above and with reference to FIG. 2, or any other appropriate image as may be used to load a runtime program into runtime memory of a computing apparatus. The randomization image may be any suitable randomization image such as the randomization image 110 described above and with reference to FIG. 1, the randomization image 214 or the combined image 220 described above and with reference to FIG. 2 or any appropriate randomization image configured to support the runtime randomization process 310.

The illustrated process 300 begins after a kernel has been loaded into primary memory of a computing apparatus. In the illustrated embodiment 300 the computing apparatus is configured to execute computer programs within a virtual memory space and to swap virtual memory pages into and out of physical memory as required. The process 308, performs runtime randomization 310 on the loaded kernel image, then starts 312 the non-processor specific portion of the kernel initialization process 306.

Once the kernel head. S code receives control, initial setup 308 is performed. Setup 308, includes creating page tables and enabling the memory management unit (MMU). When desired ASLR may be performed as described above to help hide memory locations from an attacker. Once ASLR has been completed, the MMU is disabled, page tables are updated based on the new address space layout, and the MMU is re-enabled.

The runtime randomization 310 is then initiated 314. In one embodiment the .text segment is randomized. Optionally, additional segments or portions of the kernel code, such as the data segment, may also be included in the runtime randomization 310. Including multiple segments effects only the amount of time taken during boot up of the kernel or other application being randomized, and does not adversely affect or increase execution times during subsequent operation of the computing apparatus. All desired portions of the kernel code being randomized are copied to a temporary location. The copied portions of the kernel code include a plurality of relocatable objects, each of which is described by a set of owner tables included in the randomization image. Optionally the original locations of the copied portions of the code may be initialized to any desired values. Initialization can prevent an attacker from developing an attack based on data or instructions that are not overwritten by the runtime randomization process.

The plurality of relocatable objects is then copied, based on a newly created random order, back into the original code area and a runtime offset table is generated and populated with offsets to the randomly ordered relocatable objects. The offsets represent the difference between the newly created runtime address of the relocatable object and the link time object address included in the linked executable image. The offsets may be computed as illustrated in equation 1:

$$\text{Object offset}[i] = \text{Runtime object address}[i] - \text{linktime object address}[i] \quad (\text{eq.1})$$

where i indicates the $i^{th}$ relocatable object in the plurality of relocatable objects, the runtime object address[i] is the address of the $i^{th}$ relocatable object in the randomized reordering, and the linktime object address[i] is the address of the $i^{th}$ relocatable object within the linked executable image that was generated during static linking of the kernel.

The global symbol table, such as kallsyms, may when desired by updated with the new locations resulting from the random reordering of the relocatable objects. The runtime symbol addresses may be computed as illustrated in equation (2):

$$\text{Runtime symbol address}[i] = \text{linktime symbol address}[i] + \text{object offset}[i] \quad (\text{eq.2})$$

where i indicates the $i^{th}$ symbol in the global symbol table, kallsyms, the runtime symbol address[i] is the address of the $i^{th}$ symbol at runtime after the randomized reordering of relocatable objects, the linktime symbol address[i] is the address of the $i^{th}$ symbol within the linked executable image that was generated during static linking of the kernel, and the object offset[i] is given by equation 1.

Relocations are applied to each relocation address and symbol address to obtain runtime values that correspond to the randomly reordered relocatable objects. The runtime relocation addresses can be efficiently computed as illustrated by equation (3):

$$\text{Runtime relocation address}[i] = \text{linktime relocation address}[i] + \text{object offset}[i] \quad (\text{eq.3})$$

where i indicates the address of the $i^{th}$ relocated address, the runtime relocation address[i] is the address of the $i^{th}$ relocated address at runtime after the randomized reordering of relocatable objects, the linktime relocation address[i] is the address of the $i^{th}$ address within the linked executable image, and the object offset[i] is given by equation 1. The runtime symbol addresses are computed using equation 4:

$$\text{Runtime symbol address}[i] = \text{linktime symbol address}[i] + \text{object offset}[i] \quad (\text{eq.4})$$

where i indicates the address of the $i^{th}$ relocated symbol, the runtime symbol address[i] is the address of the $i^{th}$ relocated symbol at runtime after the randomized reordering of relocatable objects, the linktime symbol address[i] is the address of the $i^{th}$ symbol within the linked executable image, and the object offset[i] is given by equation 1.

In embodiments where ASLR is applied, it may also be necessary to update the kernel's dynamic relocation table. This update can be achieved in a similar fashion as described above by applying the relocations and updating the dynamic relocation table based on equation 3 and equation 4.

Figure 4:
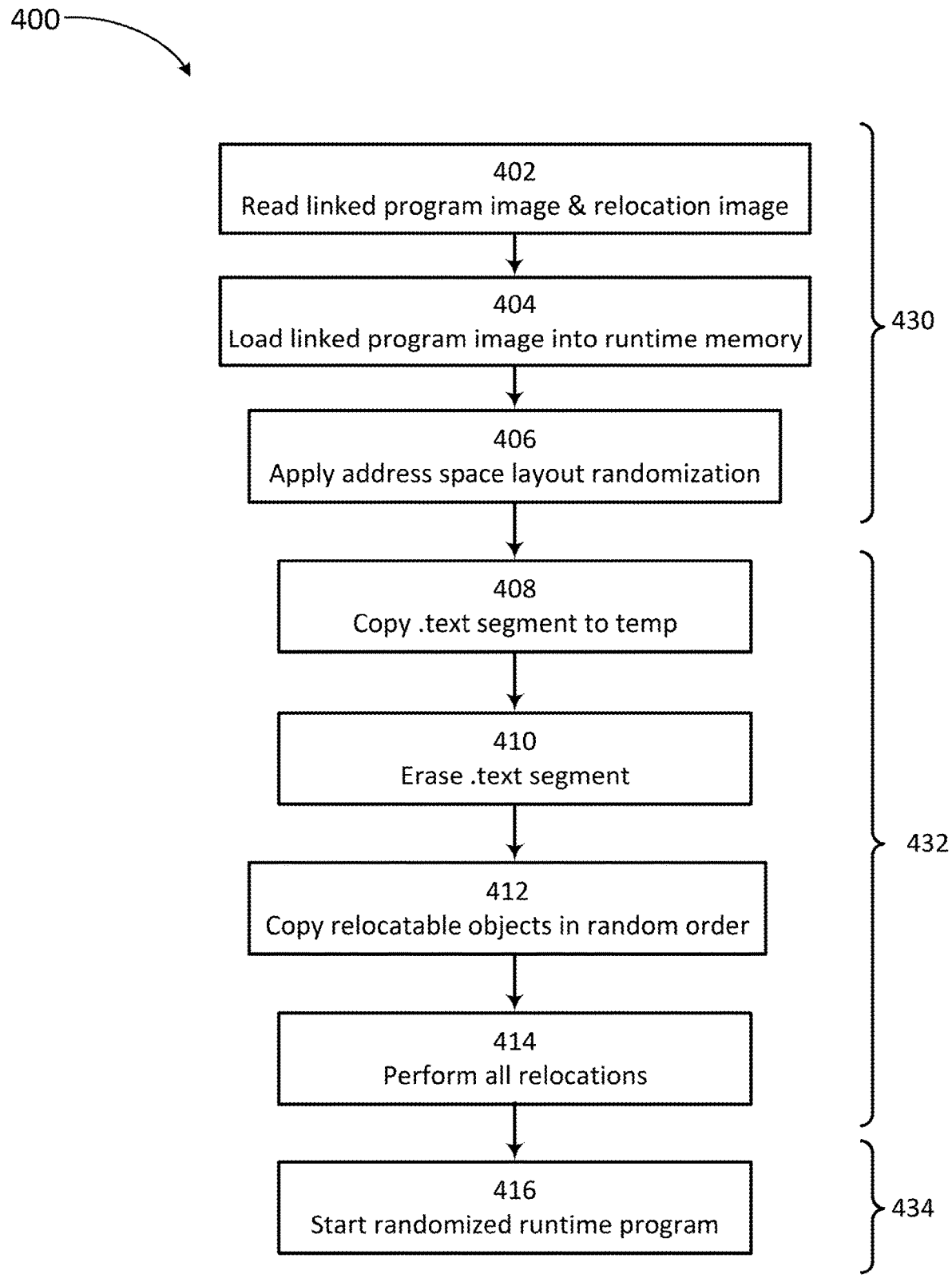
FIG. 4 illustrates a flow chart of an exemplary method for loading and executing a randomized runtime program incorporating aspects of the disclosed embodiments.

Referring now to FIG. 4 there can be seen a flow chart illustrating an exemplary method 400 for loading and executing a randomized runtime program incorporating aspects of the disclosed embodiments. The exemplary method 400 provides improved software security within a computing apparatus, such as a mobile smart phone or other communications enabled mobile computing apparatus.

The exemplary method 400 is configured to read and load 430 a runtime program into a main memory of a computing apparatus, randomize 432 the runtime program to generate a randomized runtime program, and to start and execute 434 the randomized runtime program. Use of the exemplary method 400 improves software security by modifying the addresses of functions, data objects, and other program features such that the runtime addresses of these programmatic gadgets are unknown and unknowable to an attacker.

A computing apparatus begins execution of a software program, such as an operating system kernel or other desired software application, by reading 402 a linked executable image from a non-volatile storage that is accessible to a processor or other processing device within the computing apparatus. A randomization image is also read 402 from the non-volatile storage. As will be discussed further below, the randomization image provides information corresponding to the linked executable image and is used to support runtime randomization of a runtime program.

The linked executable image is written or loaded 404 into a runtime memory of the computing apparatus which may be any type of computer accessible memory, such as a random access memory, appropriate for storing a runtime program during execution by a processor. In certain embodiments the runtime memory may be a virtual address space which is mapped as required to a physical computer memory. The linked executable image may be generated by a linker during a software build process and includes all information necessary to load and execute a runtime program.

In certain embodiments it may be desirable to apply 406 an ASLR process to the linked executable image after it has been loaded into main memory. As discussed above the application of ASLR can improve software security of a runtime program and when combined with the presently disclosed runtime randomization methods results in significantly improved protections against software attacks.

As a step before starting the program, runtime randomization 432 of the runtime program is applied to generate a randomized runtime program. A segment or other desired portion of the runtime program, such as a text segment and/or a data segment, may be copied 408 to a temporary location in memory. The copied segment includes a plurality of relocatable objects such as functions, data objects, groups of functions, or other appropriate relocatable objects that may benefit from being moved to random and unpredictable locations of the memory occupied by the runtime program.

Optionally, the memory originally occupied by the copied segment may be initialized 410 to any desired value, thereby removing any evidence of the original runtime program that otherwise may have been beneficially used by an attacker to compromise the randomized runtime program during execution.

The plurality of relocatable objects are copied back to the original segment or desired portion of the runtime program in a randomized order 412. Copying the plurality of relocatable objects in a random order 412 results in each relocatable object being located at an unpredictable and unknowable location in the memory occupied by the runtime program.

Information supplied by the randomization image may be used to perform all relocations 414 on the randomized runtime image. Performing all relocations 414 includes updating all symbol and relocation tables with information corresponding to the newly generated order and locations of the plurality of relocatable objects. As described above, the randomization image includes a set of owner tables and other information corresponding to each relocatable object. The information included in the randomization image provides data to facilitate the efficient relocation and update of addresses necessary for execution of the program being randomized.

Once all relocatable objects have been properly copied and all relocations and other address updates are completed, the randomized runtime program can be started 416 and execution may proceed.

Thus, while there have been shown, described and pointed out, fundamental novel features of the invention as applied to the exemplary embodiments thereof, it will be understood that various omissions, substitutions and changes in the form and details of apparatus and methods illustrated, and in their operation, may be made by those skilled in the art without departing from the spirit and scope of the presently disclosed invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed, described, or suggested form or embodiment as a general matter of design choice. It is the intention, therefore, to be limited only as indicated by the scope of the claims appended hereto.

What is claimed is:

1. An apparatus comprising a processor coupled to a non-volatile memory and a runtime memory, wherein the processor is configured to carry out a method comprising:
    reading, from the non-volatile memory, a linked executable image and a randomization image, wherein the linked executable image comprises a linked executable program, and the randomization image comprises one or more tables taken from the group consisting of: a symbol table, a relocation table, and an object table;
    loading the linked executable image within the runtime memory to generate a runtime program;
    performing a runtime randomization on the runtime program to generate a randomized runtime program; and
    executing the randomized runtime program,
    wherein the performing the runtime randomization on the runtime program comprises:
        copying a segment of the runtime program to a temporary location, wherein the copied segment comprises a plurality of relocatable objects; and
        generating, after the copying the segment, the randomized runtime program by writing each relocatable object in the plurality of relocatable objects into the runtime program within the runtime memory at updated addresses based on a random ordering of the plurality of relocatable objects; and
        performing relocations for the randomized runtime program, wherein the performing the relocations comprises updating addresses of the plurality of relocatable objects within the runtime memory to the updated addresses in the one or more tables taken from the group consisting of: the symbol table, the relocation table, and the object table;
    wherein the method further comprises:
        erasing, after the copying, the segment; and
        initializing, after the erasing, the segment to random data or deliberately fake information; and
    wherein the loading the linked executable image comprises:
        generating a random offset value;
        loading the runtime program based on the random offset value; and
        updating a dynamic relocation table based on the random offset value.

2. The apparatus of claim 1 wherein the segment comprises a plurality of segments and the plurality of segments comprises one or more of a text segment and a data segment, and the processor is configured to copy the plurality of segments to the temporary location.

3. The apparatus of claim 1 wherein the linked executable image and the randomization image comprise a compressed data, and the processor is configured to read and decompress the compressed data.

4. The apparatus of claim 1 wherein the plurality of relocatable objects comprises one or more of a compilation unit, a function, and a data object, and the processor is configured to write each relocatable object in the plurality of relocatable objects into the randomized runtime program based on the random ordering of the plurality of relocatable objects.

5. The apparatus of claim 1 wherein the processor is configured to perform the runtime randomization within the context of a boot loader.

6. The apparatus of claim 1 wherein the randomization image is embedded within the linked executable image and the processor is configured to read the linked executable image and the randomization image.

7. The apparatus of claim 1 wherein the runtime program comprises a kernel and the processor is configured to perform the runtime randomization within the context of the kernel.

8. The apparatus of claim 1 wherein the apparatus comprises a mobile communication device.

9. A method comprising:
    reading, from a non-volatile memory, a linked executable image and a randomization image, wherein the linked executable image comprises a linked executable program, and the randomization image comprises one or more tables taken from the group consisting of: a symbol table, a relocation table, and an object table;
    loading the linked executable image within the runtime memory to generate a runtime program;
    performing a runtime randomization on the runtime program to generate a randomized runtime program; and
    executing the randomized runtime program,
    wherein the performing the runtime randomization on the runtime program comprises:
        copying a segment of the runtime program to a temporary location, wherein the copied segment comprises a plurality of relocatable objects; and
        generating, after the copying the segment, the randomized runtime program by writing each relocatable object in the plurality of relocatable objects into the runtime program within the runtime memory at updated addresses based on a random ordering of the plurality of relocatable objects; and performing relocations of the randomized runtime program, wherein the performing the relocations comprises updating addresses of the plurality of relocatable objects within the runtime memory to the updated addresses in the one or more tables taken from the group consisting of: the symbol table, the relocation table, and the object table;
wherein the method further includes:
  erasing, after the copying, the segment; and
  initializing, after the erasing, the segment to random data or deliberately fake information; and
wherein the loading the linked executable image comprises:
  generating a random offset value;
  loading the runtime program based on the random offset value; and
  updating a dynamic relocation table based on the random offset value.

10. The method of claim 9 wherein the segment comprises a plurality of segments and the plurality of segments comprises one or more of a text segment and a data segment, and the plurality of segments are copied to the temporary location.

11. The method of claim 9 wherein the method is performed within a mobile communication device.

12. A computer program product comprising non-transitory computer program instructions that when executed by a processor are configured to cause the processor to perform the method comprising:
  reading, from a non-volatile memory, a linked executable image and a randomization image, wherein the linked executable image comprises a linked executable program, and the randomization image comprises one or more tables taken from the group consisting of: a symbol table, a relocation table, and an object table;
  loading the linked executable image within the runtime memory to generate a runtime program;
  performing a runtime randomization on the runtime program to generate a randomized runtime program; and
  executing the randomized runtime program,
  wherein the performing the runtime randomization on the runtime program comprises:
    copying a segment of the runtime program to a temporary location, wherein the copied segment comprises a plurality of relocatable objects; and
    generating, after the copying the segment, the randomized runtime program by writing each relocatable object in the plurality of relocatable objects into the runtime program within the runtime memory at updated addresses based on a random ordering of the plurality of relocatable objects; and
    performing relocations of the randomized runtime program, wherein the performing the relocations comprises updating addresses of the plurality of relocatable objects within the runtime memory to the updated addresses in the one or more tables taken from the group consisting of: the symbol table, the relocation table, and the object table;
  wherein the method further includes:
    erasing, after the copying, the segment; and
    initializing, after the erasing, the segment to random data or deliberately fake information; and
  wherein the loading the linked executable image comprises:
    generating a random offset value;
    loading the runtime program based on the random offset value; and
    updating a dynamic relocation table based on the random offset value.

13. The computer program product of claim 12, wherein the segment comprises a plurality of segments and the plurality of segments comprises one or more of a text segment and a data segment, and the plurality of segments are copied to the temporary location.

14. The computer program product of claim 12, wherein the linked executable image and the randomization image comprise a compressed data, and the processor is configured to read and decompress the compressed data.

15. The computer program product of claim 12, wherein the plurality of relocatable objects comprises one or more of a compilation unit, a function, and a data object, and the processor is configured to write each relocatable object in the plurality of relocatable objects into the randomized runtime program based on the random ordering of the plurality of relocatable objects.

16. The computer program product of claim 12, wherein the processor is configured to perform the runtime randomization within the context of a boot loader.

17. The computer program product of claim 12, wherein the randomization image is embedded within the linked executable image and the processor is configured to read the linked executable image and the randomization image.

18. The computer program product of claim 12, wherein the runtime program comprises a kernel and the processor is configured to perform the runtime randomization within the context of the kernel.

19. The computer program product of claim 12, wherein the method is performed in a mobile communication device.

20. The method of claim 9, wherein the linked executable image and the randomization image comprise a compressed data, and the processor is configured to read and decompress the compressed data.

21. The method of claim 9, wherein the plurality of relocatable objects comprises one or more of a compilation unit, a function, and a data object, and the processor is configured to write each relocatable object in the plurality of relocatable objects into the randomized runtime program based on the random ordering of the plurality of relocatable objects.

22. The method of claim 9, wherein the processor is configured to perform the runtime randomization within the context of a boot loader.

23. The method of claim 9, wherein the randomization image is embedded within the linked executable image and the processor is configured to read the linked executable image and the randomization image.

24. The method of claim 9, wherein the runtime program comprises a kernel and the processor is configured to perform the runtime randomization within the context of the kernel.

* * * * *